United States Patent [19]

Lucak et al.

[11] Patent Number: 5,153,884
[45] Date of Patent: Oct. 6, 1992

[54] INTELLIGENT NETWORK INTERFACE CIRCUIT

[75] Inventors: Mark A. Lucak; Jonathon R. Engdahl, both of Saline; Michael T. Klein, Ann Arbor, all of Mich.

[73] Assignee: Allen-Bradley Company, Inc., Milwaukee, Wis.

[21] Appl. No.: 552,961

[22] Filed: Aug. 15, 1990

[51] Int. Cl.⁵ .................. H04L 1/16; G08C 25/02
[52] U.S. Cl. ........................... 371/32; 371/33
[58] Field of Search ............ 371/32, 33; 370/85.1, 370/94.1

[56] References Cited

U.S. PATENT DOCUMENTS

| | | | |
|---|---|---|---|
| 3,824,547 | 7/1974 | Green et al. | 371/32 |
| 4,149,142 | 4/1979 | Kageyama et al. | 371/32 |
| 4,549,297 | 10/1985 | Nishimoto | 371/33 |
| 4,750,177 | 6/1988 | Hendrie et al. | 371/32 |

*Primary Examiner*—Charles E. Atkinson
*Attorney, Agent, or Firm*—Quarles & Brady

[57] ABSTRACT

An interface circuit couples a host processor in an industrial control system to a local area communications network. In includes a protocol machine for receiving and transmitting messages on the network and an interface controller which is programmed to implement one or more protocols. As a message is received by the protocol machine, the interface controller anticipates a responsive message which it writes to the protocol machine even as the message is being received. If the message is received accurately, the responsive message is transmitted without delay.

4 Claims, 9 Drawing Sheets

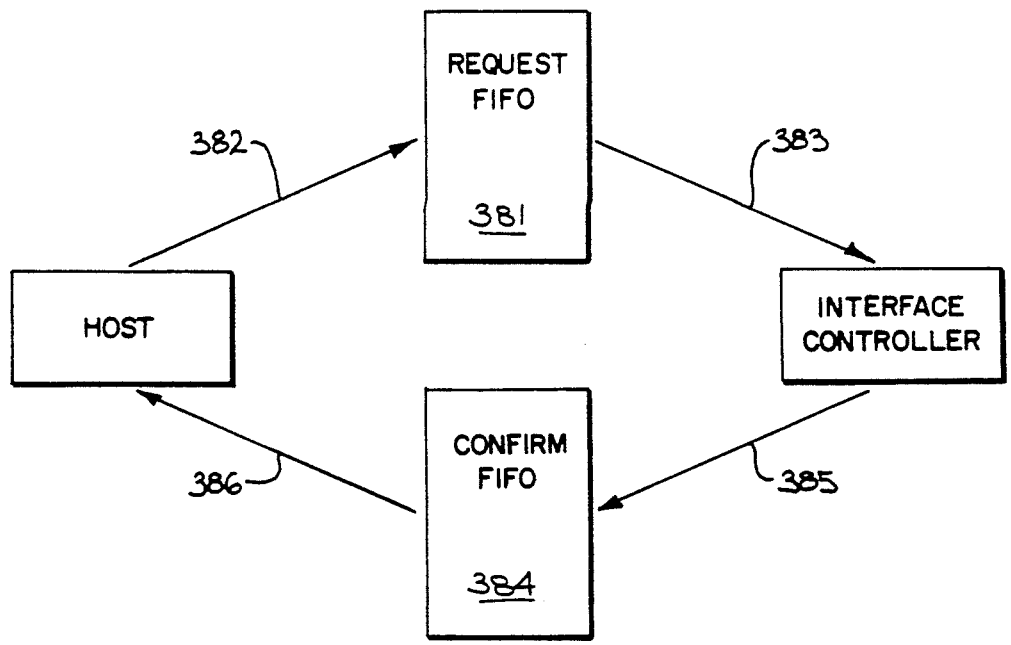
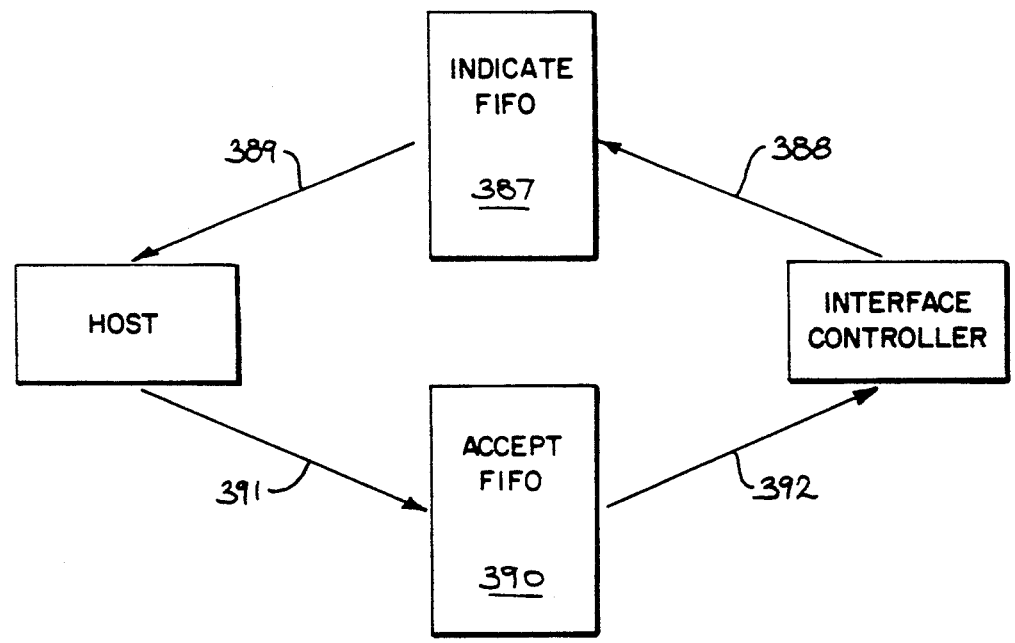
FIG. 5
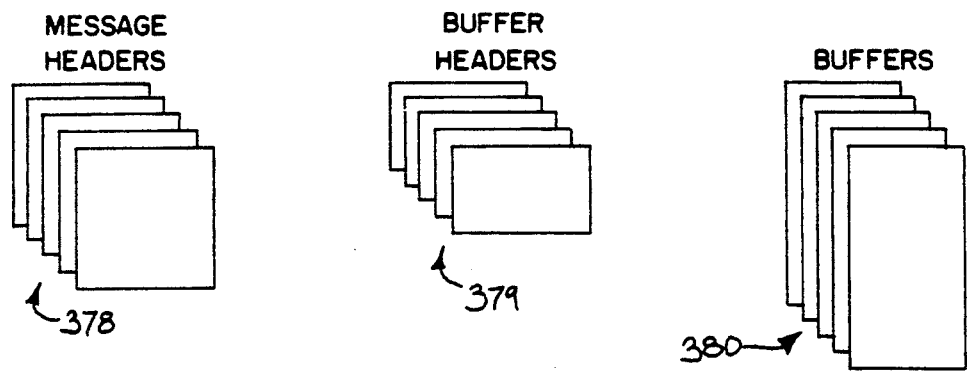

INTELLIGENT NETWORK INTERFACE CIRCUIT

BACKGROUND OF THE INVENTION

The field of the invention is serial communication links, and, particularly, local area networks (LANS) in which two or more nodes are connected to a communications media and messages are conveyed between the nodes.

There are numerous protocols employed in local area networks, although many of the protocols have common features and services. One common feature is that when a message is sent from one node to another, a responsive message is promptly sent by the receiving node. For example, a message containing data is sent to a node, and the receiving node promptly acknowledges that the data was, or was not, received accurately. Such messages typically constitute a significant proportion of the traffic on the network, and the efficient handling of such messages can significantly improve the overall efficiency of the entire network.

The speed at which a local area network operates to convey messages between its nodes is determined by a number of factors. The most important factor is the baud rate at which a message is conveyed over the communications media. For example, all other factors being equal, a network which operates at a baud rate of five megabits/second is five times faster than a network which operates at a baud rate of one megabits/second. Another important factor, however, is the efficiency of the network. For example, if considerable time is consumed by the protocol needed to maintain control of the network, or if there is considerable dead time during which no information can be conveyed, the network is less efficient. The present invention addresses the delay, or dead time, between the receipt of a message by a node on the network and that node's transmission of a response.

SUMMARY OF THE INVENTION

The present invention relates to an interface to a communications network, and particularly, to an interface circuit which prepares a responsive message for transmission while the message to which it responds is still being received. More specifically, the interface circuit includes protocol machines for receiving and transmitting messages on the communications media; an interface controller which is operable to analyze a control code in a first message being received by the protocol machine and write a responsive second message to the protocol machine, while the protocol machine is still receiving the first message; and a holdoff timer which will check the integrity of the first message when it has been completely received to determine if any errors occurred and, after a preselected delay, enable the protocol machine to transmit the second message if no errors were detected. The interface controller may in some situations also create and enable the protocol machine to transmit a third message if an error was detected.

A general object of the invention is to improve the efficiency of the network by reducing the dead time between the receipt of a message and the transmission of a responsive message. Rather than wait for the receipt of the entire message, the interface controller reads a control code at the beginning of a received message which indicates the responsive message that should be transmitted. The interface controller proceeds to create that responsive message and write it to the transmit section of the protocol machine even while the first message is still being received. As a result, if the first message is accurately received, the transmit section of the protocol machine is enabled by the holdoff timer and the responsive message is transmitted after a predetermined delay after receipt of the first message. If the first message is not accurately received, then the interface controller must alter the responsive message before the transmit section of the protocol machine is enabled. While the latter procedure may increase the dead time between messages in some instances, it should occur very infrequently and have no substantial effect on network efficiency.

A more specific object of the invention is to provide an interface circuit which anticipates the responsive message to be sent even before the first message is completely received. The control code at the beginning of a received message may indicate that a responsive message must be transmitted by the receiving node. For example, a send data with acknowledge message (SDA) requires that the receiving node respond immediately with a message which acknowledges (ACK) that it correctly received the SDA message. Similarly, in a token passing network when a node receives the token message, it immediately responds by either sending a message waiting in its transmit queue, or if the transmit queue is empty, by re-transmitting the token message to its successor node. In any case, the nature of the responsive message can be anticipated by the control code of the received message, and the interface controller can proceed to set up the responsive message in parallel with the continued receipt of the first message.

Another more specific object of the invention is to enable a commercially available microcomputer to perform the functions of the interface controller. The use of a programmable microcomputer enables the interface circuit to be used in a wide variety of networks with differing protocols. Such general purpose devices can be programmed to customize the interface circuit to the particular protocol being used on the network. Unfortunately microcomputers often are not fast enough for many applications and their processing lengthens the time interval between messages. The present invention enables a microcomputer to perform all or most, of its functions in parallel with the protocol machine so that it has minimal, if any, impact on the dead time between messages.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 5 is a pictorial representation of the data structures stored in the channel A and channel B segments which form part of the memory map of FIG. 4;

DESCRIPTION OF THE PREFERRED EMBODIMENT

Figure 1:
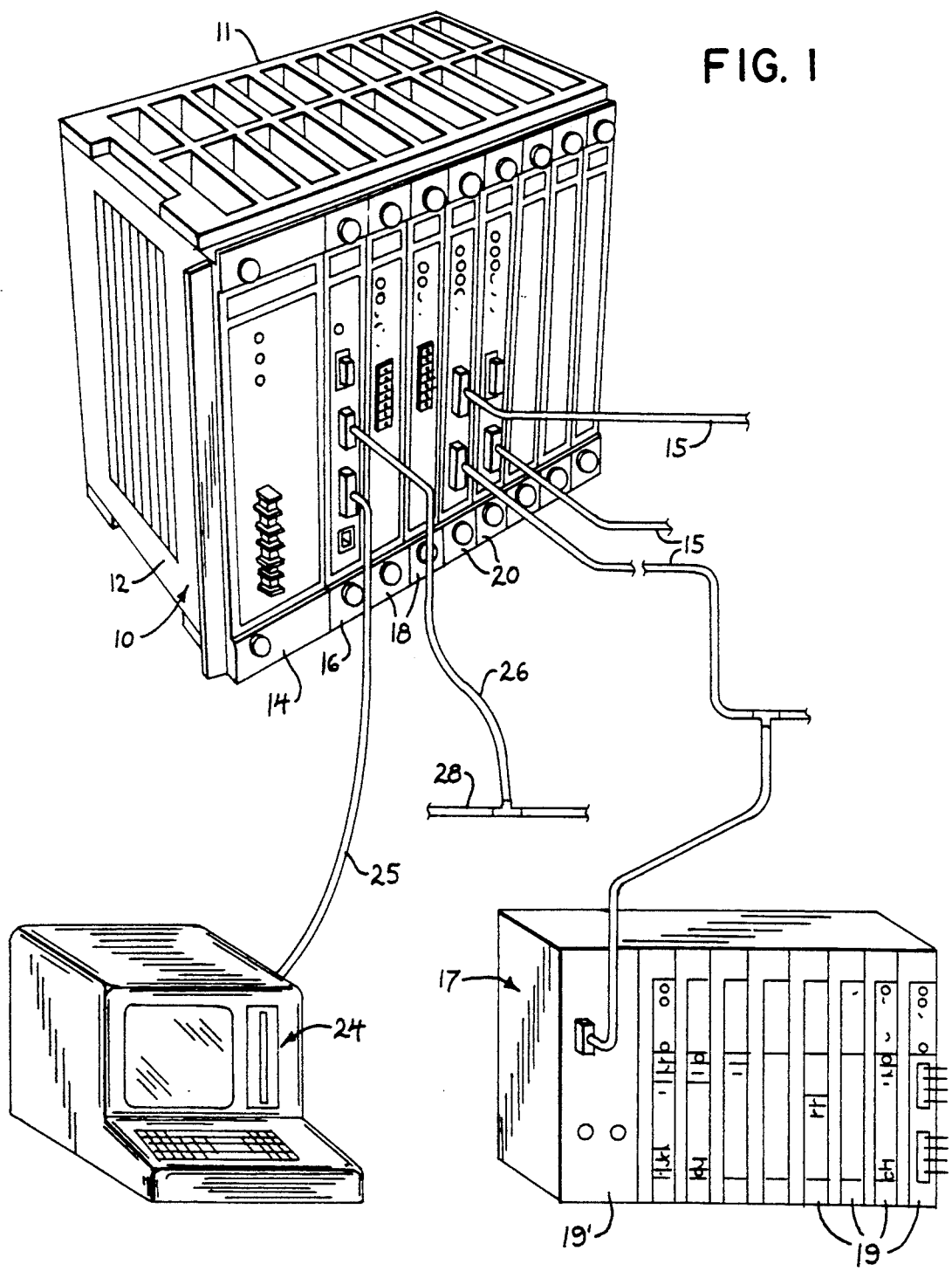
FIG. 1 is a pictorial view of a programmable controller system which employs the present invention.

Referring to FIG. 1, a programmable controller 10 is housed in a rack 12 which includes a series of slots that receive a plurality of printed circuit board modules. These functional modules connect to a mother board which extends along the back surface of the rack 12 to provide a backplane 11. The backplane 11 has a plurality of module connectors which are interconnected by a conductive pattern on the backplane. The backplane 11 provides a series of signal buses to which the modules connect. The rack 12 contains a power supply module 14, a system controller 16, a number of program execution processor modules 18 and a plurality of remote input/output (I/O) scanner modules 20. The physical construction of the rack 12 is disclosed in U.S. Pat. No. 4,716,495, which is assigned to the same assignee as the present invention.

Up to four remote I/O scanner modules 20 interface the controller 10 to external remote I/O racks 17 via serial I/O data links, such as link 15. Each remote I/O rack 17 has a plurality of local I/O modules 19 which are coupled to individual sensors and actuators on the controlled equipment. The local I/O modules 19 may take many forms and may include, for example, DC inputs or outputs, AC inputs or outputs, analog inputs or outputs, and open or closed loop positioning modules. The remote I/O rack 17 also contains an adapter module 19', such as the one described in U.S. Pat. No. 4,413,319, which connects to the serial communications network 15 and couples message data between the I/O modules 19 and the network 15.

The system controller 16 is connected through cable 22 to a programming terminal 24, which is used to load the user programs into the programmable controller and configure its operation, as well as monitor its performance. The terminal 24 is a personal computer programmed to enable the user to develop the system's control programs. The control programs are downloaded into the programmable controller and the terminal 24 may be disconnected from the system controller 16 if further monitoring is not required. The system controller 16 may also be connected via a cable 26 to a local area network 28 over which it may receive data and programming instructions, as well as issue status information and report data to a central computer. This enables a central computer or central terminal to program and control the operation of a plurality of programmable controllers on a factory floor.

The system controller module 16 is a typical environment in which the present invention is used. The module 16 has a microprocessor (not shown) which serve as a host processor that performs a number of functions related to the operation of the programmable controller. In addition, this host processor must communicate through one or more serial communication links or networks through a communications interface circuit that forms part of the module 16. The host processor exchanges message data with the communication network through the communications interface circuit which is responsible for executing the particular network protocol necessary to send or receive message data. Ths host processor is capable of reading data, including message data, from a memory which is shared with the communications interface circuit and it can write data to that shared memory.

Figure 2:
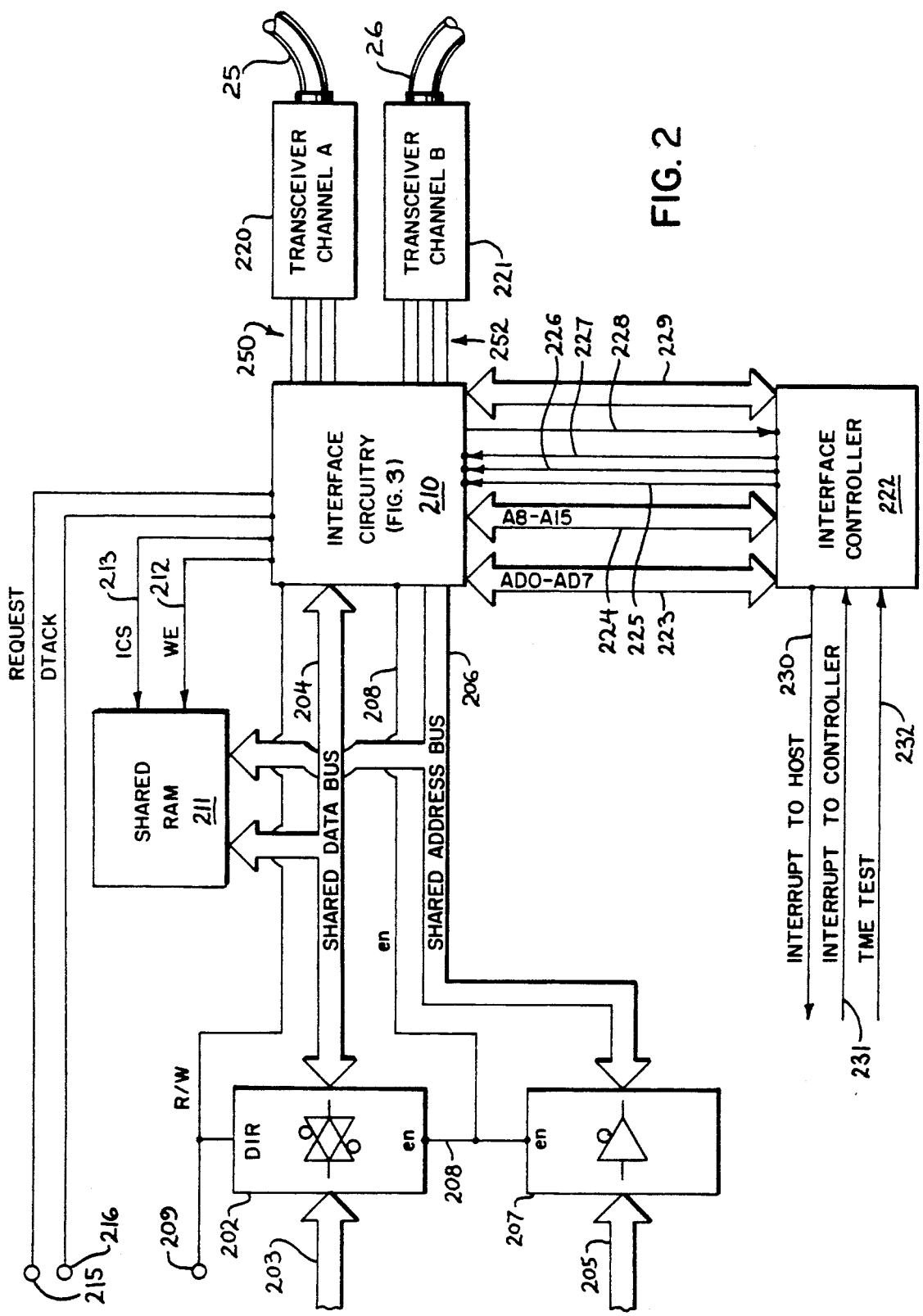
FIG. 2 is a block diagram of a communications interface circuit which is used in the programmable controller of FIG. 1.

Referring particularly to FIG. 2, the preferred embodiment of the communications interface circuit is designed to couple a host processor with either of two serial communications links 25 and 26. The host processor (not shown in FIG. 2) connects to the communications interface circuit through a set of bi-directional gates 202 which link the host's data bus 203 to a shared data bus 204. The host's address bus 205 is coupled to a 15-bit shared address bus 206 by a set of fifteen gates 207 that are enabled along with the data gates 202 when a logic low signal is received through a "en" control line 208. The host initiates a read or write cycle by asserting a "request" control line 215, and the interface circuit 210 acknowledges the request by asserting a DTACK control line 216 when access to the shared buses 204 and 205 is granted. The host's read/write control line 209 determines the direction of data transfer through the data gates 202.

The shared buses 204 and 206 connect to a shared random access memory (RAM) 211 which is controlled by the interface circuitry 210 through a WE control line 212 and an ICS control line 213.. The interface circuitry 210 also connects to the shared buses 204 and 206 and it operates the en control line 208 to enable access to the shared RAM 211 by the host processor.

As will be explained in more detail below, the shared RAM 211 serves as a means for exchanging information, including message data, between the host processor and the communications interface. Message data may be written to the shared RAM 211 by either the host processor or the interface circuitry 210 and the other device can read that message data after being notified of its presence. Also, as will be described in detail below, data required by the communications interface circuit to operate properly with the host processor is stored in the shared RAM 211, as is data which configures the communications interface circuit to the particular application.

Referring still to FIG. 2, the interface circuitry 210 is an application specific integrated circuit (ASIC) which performs a number of functions. First, it arbitrates access to the shared RAM 211 and controls read and write cycles to the shared RAM 211. It also passes message data from the shared RAM 211 to either an A channel transceiver 220 or a B channel transceiver 221 and it passes message data from the transceivers 220 or 221 back to the shared RAM 211. It also permits an interface controller 222 to read data from the shared RAM 211 and write data to it.

The operation of the interface circuitry 210 is controlled by the interface controller 222 which is a programmed microcomputer, model "Super 8" manufactured by Zilog, Inc. The interface controller 222 connects to the interface circuitry 210 through an 8-bit data/address bus 223, and an 8-bit address bus 224 and a set of control lines. When a 16-bit address is applied to the buses and 224, a signal is asserted on AS control line 225, and when 8-bits of data is applied to bus 223, a signal is asserted on DS control line 226. The direction of data transfer on bus 223 is determined by the logic state of a R/W control line 227. The above buses and control lines are driven by the interface controller 222, however, a number of control lines are driven by the interface circuitry 210. These include a WAIT control line 228 which places the interface controller 222 in a wait state, and a series of interrupt lines and flag lines which are indicated collectively at 229.

The interface controller 222 is also linked to the host processor by a set of control lines. These include an INTERRUPT TO HOST control line 230 which is asserted by the interface controller 222 and which signals the host processor that it should read certain data structures in the shared RAM 211. Likewise, the host processor can interrupt the interface controller 222 through an INTERRUPT TO CONTROLLER control line 231, which signals the interface controller 222 to read the shared RAM 211 for information from the host processor. Finally, a TME control line 232 may be asserted by the host processor to signal the interface controller 222 that it should enter into its test mode of operation.

Figure 3:
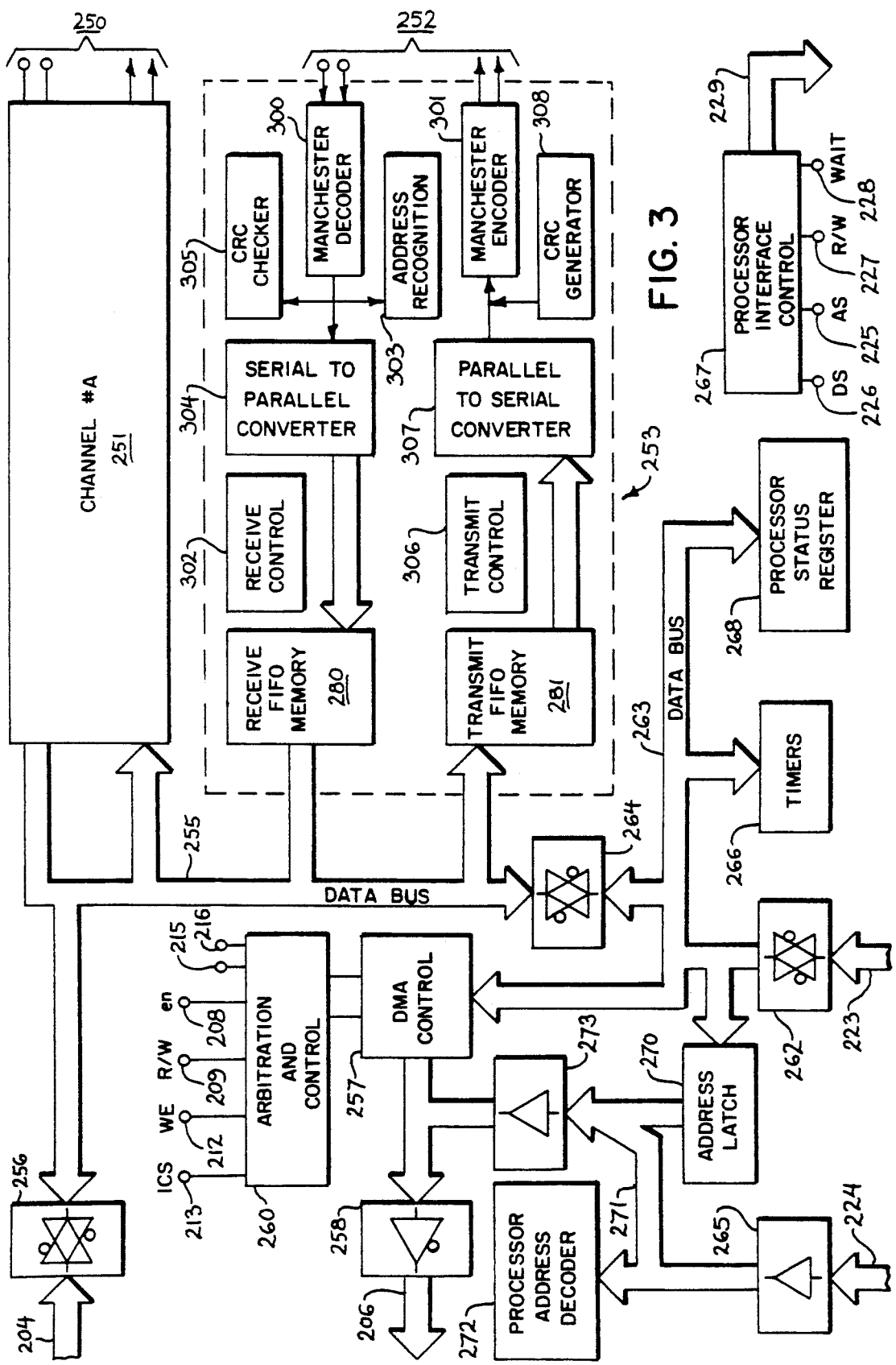
FIG. 3 is a circuit diagram of the interface circuit which forms part of the circuit of FIG. 2.

Referring particularly to FIGS. 2 and 3, the interface circuitry 210 links the transceivers 220 and 221 to the shared RAM 211 and the interface controller 222 to the shared RAM 211. The channel A transceiver 220 is connected through lines 250 to a channel A serial protocol machine 251, and the channel B transceiver 221 is connected through lines 252 to a channel B serial protocol machine outlined by dashed line 253. The serial protocol machines 251 and 253 are identical in construction and operation.

Message data to and from the serial protocol machines 251 and 253 is coupled to the shared RAM 211 through an 8-bit data bus 255 and a set of eight bi-directional data gates 256. A DMA control 257 actually carries out the transfer of message data to and from the shared RAM 211 by generating addresses on its shared address bus 206 through a set of fifteen address gates 258. Control of the shared buses 204 and 206 is determined by an arbitration and control circuit 260 which arbitrates requests from the host processor, from the interface controller 222 and from both the A and B channels of the DMA control 257.

Referring still to FIGS. 2 and 3, the interface controller buses 223 and 224 connect to the interface circuitry 210 through a set of eight bi-directional gates 262 and a set of eight address gates 265. When data is present on the bus 223 as signaled by the DS control line 226, the bi-directional gates 262 are enabled and the data is conveyed there through in the direction indicated by R/W control line 227. This data is applied to an 8-bit data bus 263, which in turn is coupled to the 8-bit data bus 255 by another set of eight bi-directional data gates 264. In this manner, data may be coupled to or from the shared RAM 211 to the data bus 263 and through gates 262 to the interface controller 222. Data on the bus 263 may also be conveyed to the DMA control 257 to enable the interface controller 222 to set the memory address which the DMA control will generate. It also couples to a set of timers 266 and processor status registers 268. The interface controller 222 may thus write data to the timers 266 which configure the serial protocol machines 251 and 253 to the particular timing requirements of the local area networks.

One element of timers 266 is an 8-bit number which indicates the number of bit times the transmitter will be held off after a previous message is either received or transmitted. This timer is referred to hereinafter as the "holdoff timer".

The interface controller 222 may also write data to the registers 268 which control the operation of the interface circuitry 210 while the interface controller 222 is performing other functions. The interface controller 222 may also read from the processor status registers 268 to determine the state of the interface circuitry 210 at any moment in time. The contents of the processor status register 268 is provided in Table A.

TABLE A

| Processor Status Registers | |
|---|---|
| 1 bit | valid Manchester signal available |
| 1 bit | carrier detected |
| 1 bit | Fault detect |
| 4 bit | state of receive FIFO fullness |
| 3 bit | number of preamble flags sent before a packet |
| 1 bit | transmitter is busy |
| 1 bit | receiver busy |
| Receiver syndrome register - cause of a "bad packet" interrupt to microprocessor. | |
| | receive FIFO overflow |
| | Manchester code lost |
| | packet too short |
| | packet too long |
| | abort message received |
| | CRC bad |
| | read from empty receive FIFO |
| Transmit syndrome register - | |
| | transmit FIFO underflow (empty) |
| | too many opening flags sent due to unavailability of timely message |
| | write to full transmit FIFO |

When the interface controller 222 asserts an address on its bus 223, as indicated by its AS control line 225, that address is latched at address latch 270. Subsequently, when the upper eight bits of the address are asserted on bus 224, the complete 16-bit address is applied to an address bus 271. This address is decoded by decoder 272 to enable one of the devices connected to the data bus 263. In addition, if the shared RAM 211 is addressed, the decoder 272 generates a request to the arbitration and control circuit 260 and a wait signal is produced for the interface controller 222 by a processor interface control 267 through control line 228. When access is granted, this wait signal is removed and a set of address gates 273 are enabled to allow the address produced by interface controller 222 to be coupled to the shared address bus 206 through gates 258.

Through the above described buses and gates, the interface controller 222 has full access to the shared RAM 211 where it can exchange information with the host processor. In addition, the interface controller 222 can configure the operation of the serial protocol machines 251 and 253, control their operation, and monitor their operation.

Referring still to FIG. 3, the serial protocol machines 251 and 253 handle the bit oriented protocol structure used by the local area networks to which they connect. They are sometimes referred to as an HDLC engine which transmit and receive the packeted information in the serial format of the local area network protocol. Each provides the flags, zero insertion and deletion, and CRC checking and generation. Each serial protocol machine 251 and 253 is divided into a receive section which transfers all data bytes received at a Manchester decoder 300 to the receive FIFO memory 280, and a transmit section which transmits all data bytes loaded into the transmit FIFO memory 281 through to a Manchester encoder 301.

The receive section is operated by a receive control 302 that connects to each of its functional elements. As a data packet is received through the Manchester decoder 300, the data packet is converted to 8-bit bytes of data by a serial-to-parallel converter 304 and the bytes of data are stored in the receive FIFO memory 280. The last two bytes prior to the packet's closing flag is a cycle redundancy checking (CRC) number which is compared with the number produced by a CRC checker 305. If the numbers are the same, accurate transmission of the data packet has occurred and the packet is passed onto the receive FIFO memory 280. An interrupt of the interface controller 222 (FIG. 2) is produced to indicate that a data packet has been received. If the CRC bytes indicate an error in transmission, the CRC checker 305 generates an interrupt to the interface controller 222 and an error bit is set in the receive syndrome register to inform the interface controller 222 of the problem.

The transmit section is operated by a transmit control 306 that connects to each of its functional elements. The transmit section is commanded by the interface controller 222 to send a data message stored in the transmit FIFO memory 281. If there are no receiver syndrome bit sets, and the transmit holdoff timer is not running, the transmitter automatically begins sending the preamble bits of the data packet through the Manchester encoder 301 and data bytes are then read from the transmit FIFO memory and applied to a parallel-to-serial converter 307. The data is converted to a serial bit stream which is fed to the Manchester encoder 301 for transmission. A CRC generator 308 monitors all bits in the transmitted data packet and when the last data bit has been sent, the CRC generator 308 produces a 16-bit CRC number which is used as described above to check the integrity of the data packet when it is received at another station.

As indicated above, the shared RAM 211 stores data structures which enable the communications interface circuit to adapt to the particular host processor to which it connects and to exchange message data with that host processor. These stored data structures are illustrated generally in FIG. 4 and will now be discussed in more detail.

Figure 4:
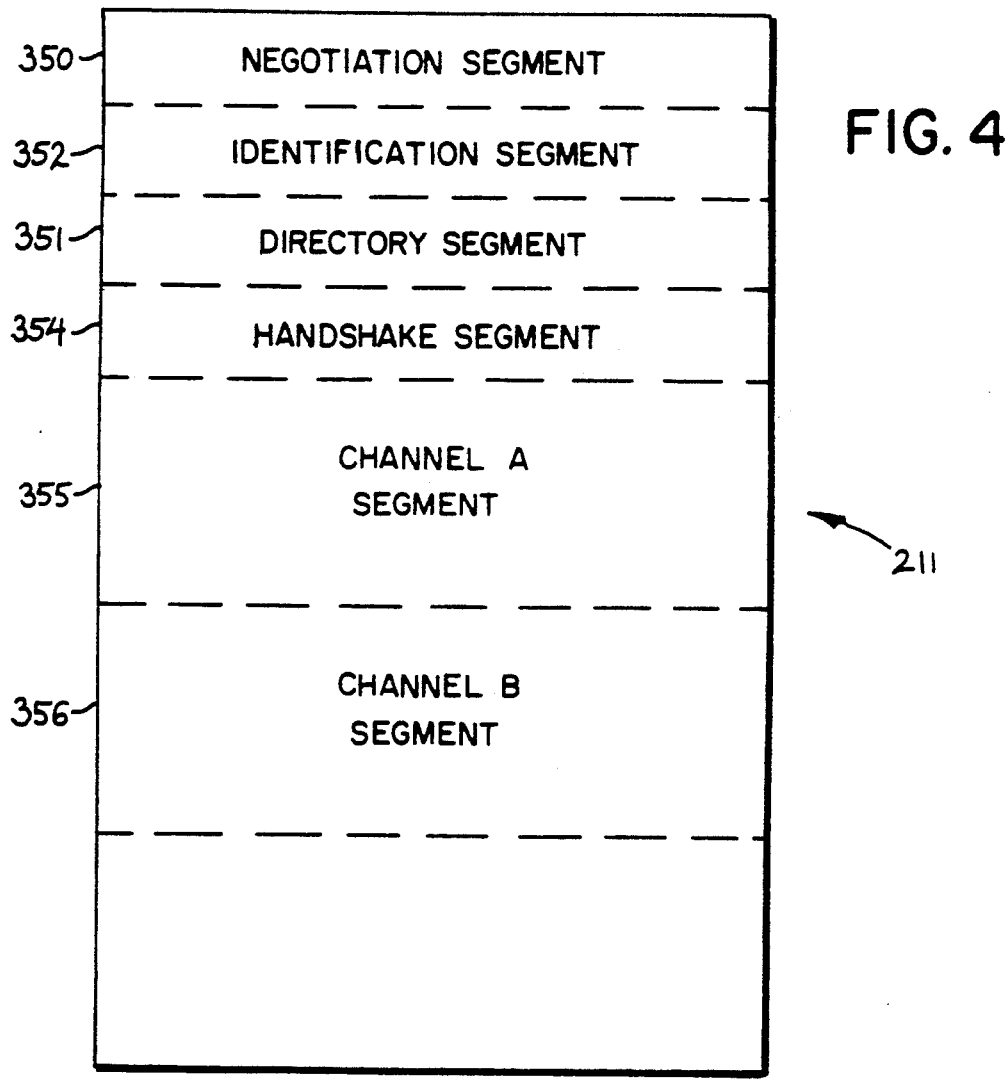
FIG. 4 is a map of the shared RAM which forms part of the circuit of FIG. 2.

Referring particularly to FIG. 4, the shared RAM 211 stores data in segments. The first segment 350 is a negotiation segment which contains 32 bytes of data that is used at power-up to negotiate the characteristics of the communications between the host and the communications interface circuit.

The second segment is an identification segment 352 which contains information that indicates the series and revision number of the communications interface circuit.

The third segment 351 is a segment directory that contains an array of segment descriptors that include the starting address of each segment in the shared RAM 211, the size of each segment, the type of segment, and the instance of the segment. The segment directory 351 is an index to the other segments in the shared RAM 211. The types of segments include:

0—negotiation segment
    1—segment directory
    2—identification segment
    4—channel segment
    5—interprocessor handshake flags
    6—selection segment The instance indicates the number of the segment of a particular type. For example, there are two channel segments 355 and 356 in the preferred embodiment and these are distinguished by their instance number "0" and "1".

Following the directory segment 351 is a handshake segment 354 which occupies eight 8-bit words per channel in the shared RAM 211. The handshake segment 354 includes four words which store flags that relate to interrupts from the host to the interface controller 222, and four words which store flags related to interrupts from the interface controller 222 to the host.

Referring still to FIG. 4, the next two segments in the shared RAM 211 store data associated with messages that are conveyed through the A channel and the B channel of the interface circuitry 210. More specifically, segment 355 stores the FIFOs, message headers, buffer headers and buffers associated with communications through channel A, and segment 356 stores similar data structures for communications through channel B. Since the two segments 355 and 356 are similar, only one will be described in detail.

Referring particularly to FIG. 5, each message which is conveyed between the host and the interface controller 222 through the shared RAM 211 is comprised of a message header, one or more buffer headers, and a data buffer associated with each buffer header. The free message headers are illustrated at 378 as a linked set of data structures, and each message header stores the following information:

| | |
|---|---|
| NEXT | pointer to the next buffer header associated with this message; |
| SERVICE | the service performed by this message; |
| PRIORITY | the priority level of this message where the protocol supports different priorities; |
| STATUS | the result of the transmission<br>0 = confirmed delivery<br>1 = confirmed nondelivery<br>2 = unconfirmed delivery<br>3 = unconfirmed nondelivery; |
| REASON | error code which indicates the cause of a failure; |
| DESTINATION ADDRESS COUNT | number of bytes required by destination address; |
| DESTINATION NETWORK ADDRESS | the destination of this message; |
| SOURCE ADDRESS COUNT | the number of bytes needed to define source address; |
| SOURCE NETWORK ADDRESS | the source of this message; |
| SAP TYPE | the type of service access point being used in this message; |
| DSAP | destination service access point number; |
| SSAP | source service access point number; |
| BUFFER HEADER POINTER | address of the first buffer header associated with this message; and |
| TAG | user defined field. |

The buffer headers are indicated in FIG. 5 at 379 as a set of linked data structures. Each buffer header stores the following information:

| | |
|---|---|
| NEXT | pointer to the next buffer header associated with this message; |
| DATA | pointer to the buffer associated with this |

-continued

| | |
|---|---|
| | buffer header; and |
| SIZE | the number of data bytes in the associated buffer. |

The buffers are indicated at 380 and each is a consecutive sequence of bytes associated with one of the buffer headers 379. Either the host or the interface controller 222 may form a message which is comprised of one or more of these data buffers 380 by storing the message data therein and then linking them together by their associated buffer headers 379. A message header 378 is then formed which identifies the first buffer header in this linked list of buffer headers 379.

Referring still to FIG. 5, if the host creates a message it stores a pointer to the header for that message in a REQUEST FIFO 381 as indicated by arrow 382. The REQUEST FIFO 381 is an array of such pointers preceded by the following stored information:

| | |
|---|---|
| NEXT IN | host index to the next available location in the FIFO where a message header pointer can be stored; |
| NEXT OUT | interface controller index to the next message pointer to be read and processed; |
| WRAP MASK | the two indexes wrap using this field; and |
| NUMBER | interrupt flag bit number used by this FIFO. |

When the interface controller 222 is interrupted, it reads the next message pointer out of the REQUEST FIFO 381 as indicated by arrow 383, and it reads the indicated message header 378 and the associated data 380 indicated by the buffer headers 379 to form a message. It confirms that the message has been received and processed by writing the pointer for the same message header into a CONFIRM FIFO 384 as indicated by arrow 385. The FIFO 384 is similar in structure to the FIFO 381, and when the host is interrupted, the host reads the next message header pointer from the confirm FIFO 384 as indicated by arrow 386. The host then reads the indicated message header from the shared RAM 211 to confirm that the message which it initiated has been processed.

Similar data structures exist for messages initiated by the interface controller 222. Referring still to FIG. 5, when the interface controller 222 receives a message on the network, it stores the message data in the shared RAM 211 in available buffers 380 and the message header in an available message header 378. It then stores a pointer to the message header 378 in an indicate FIFO 387, as indicated by arrow 388, and interrupts the host. The host processor reads the next pointer in the indicate FIFO 387, as indicated by arrow 389, and the header and message data are read from the shared RAM 211. The host processor then writes the same pointer to an accept FIFO 390, as indicated by arrow 391, and it interrupts the interface controller 222. The interface controller 222 reads the pointer from the accept FIFO 390 to confirm that the message has been accepted by the host as indicated by arrow 392.

The channel segments 355 and 356 in the shared RAM 211 (FIG. 4) also store data structures associated with network management functions. These include four management FIFOs and associated message headers, buffer headers and buffers (not shown in the drawings) which operate as described above. In addition, there are four management interrupt flags in the handshake segment 354 which enable the host and interface controller 222 to promptly service the management FIFOs.

As indicated above, the primary function of the interface controller 222 is to relay messages between the shared RAM 211 and the interface circuitry 210. It performs this function and its other functions under the direction of programs which are stored in its internal read-only memory (not shown in the drawings). A number of these programs are interrupt driven and include a service routine which is executed when an interrupt is received from the host through line 231, and service routines which are executed when an interrupt is received from the A channel or the B channel of the interface circuitry 210. The main program which is executed by the interface controller 222, however, is illustrated in FIG. 6, and will now be described in more detail.

Figure 6:
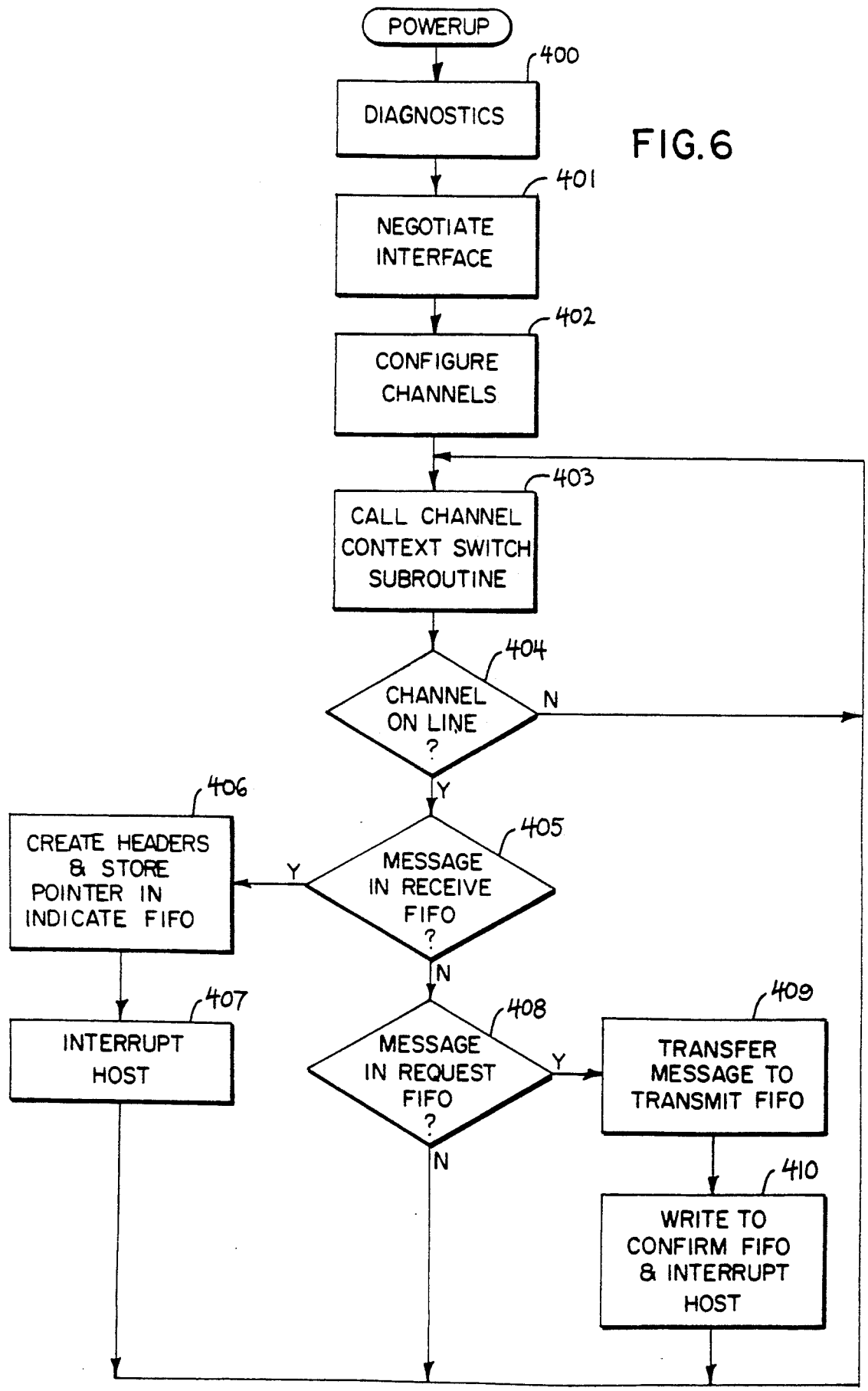
FIG. 6 is a flowchart of the main program executed by the interface controller of FIG. 4.

Referring particularly to FIG. 6, when the interface controller 222 is powered up, or physically reset, a set of instructions indicated by process block 400 are executed to perform diagnostic functions. For example, the integrity of the shared RAM 211 is thoroughly checked. Following this, a set of instructions indicated by process block 401 are executed to negotiate a set of parameters which determine how the interface controller 222 and the host will communicate with each other through the shared RAM 211.

Following negotiation, each of the two channels is configured as indicated by process block 402. Each physical channel defaults to a set of pre-defined access and protocol selections although other selections can also be made. More specifically, within each channel segment 355 and 356 of the shared RAM 211 are select segments (not shown) which can be read by the host and used to select operating parameters which are different than the default values. For example, each channel can be set for any one of four "access" types: (1) an active node on a local area network; (2) an inactive node on a local area network; (3) a scanner or an adaptor on a serial I/O link; or (4) a bridge between two local area networks. With each of these access types there is a menu which defines the various protocols that can be selected by the host, and each selectable protocol may have values of operating parameters for the protocol (i.e. baud rate, parity, etc.). When the configuration of each channel has been completed, the channel becomes operational, or "on line".

Referring still to FIG. 6, after configuration is completed, each physical channel is then alternately serviced. This is accomplished by calling a subroutine indicated at 403 which switches the channel context. This context switch involves saving the values of microcomputer registers and loading the register values for the other channel. A check is then made at decision block 404 to determine if the channel is operational, and a check is then made at decision block 405 to determine if any incoming messages have been written to the shared RAM 211 by the interface circuitry 210. If so, buffer headers 379 and message header 378 are created and a pointer to the message header 378 is stored in the next entry of the indicate FIFO 387 as indicated at process block 406. As indicated at process block 407, the proper flag in the handshake segment is then toggled and the host is interrupted to service the incoming message.

If no incoming message is present as determined at decision block 405, a check is made at decision block 408 to determine if messages have been posted for transmission in the shared RAM 211 by the host. If so, the pointer in the request FIFO 381 is read and the indicated message header 378, buffer headers 379 and buffers 380 are transferred from the shared RAM 211 to the channel's transmit FIFO 281 as indicated at process block 409. The same message header pointer is then written to the confirm FIFO in the shared RAM 211 and the host is interrupted at process block 410 to indicate that the message has been processed.

The interface controller 222 continuously cycles through this program with the context being switched between the two channels. Consequently, messages received at either channel are passed through to the host, and messages received from the host are passed through for transmission on the proper serial link.

The maximum rate at which messages can be received and transmitted is determined primarily by the speed with which the interface controller 222 can perform its functions. An important objective of the present invention is to eliminate this bottleneck by enabling the interface controller 222 to "look ahead" at the functions which are to be performed and perform them in parallel with the operation of the interface circuitry 210.

Figure 7:
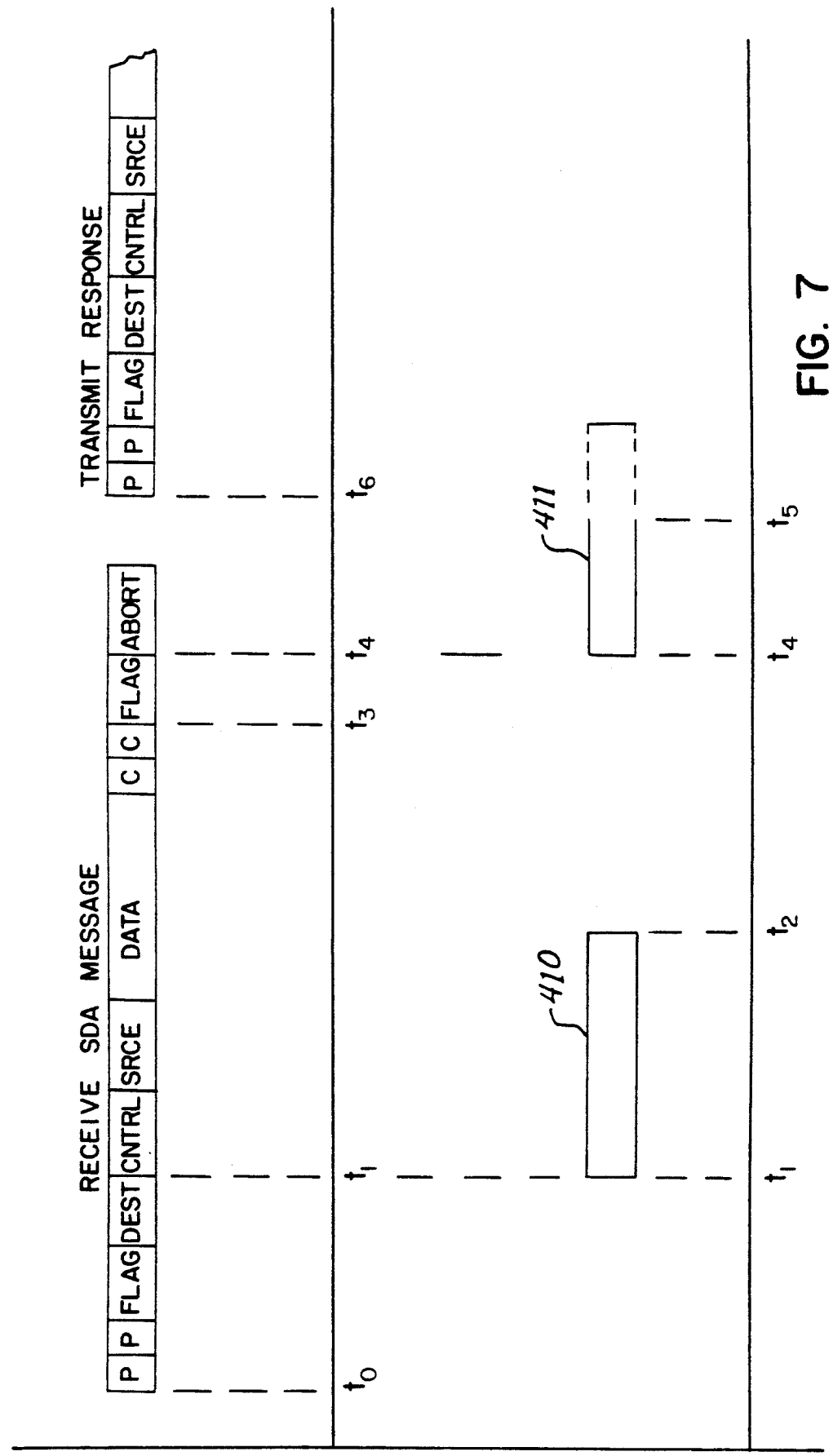
FIG. 7 is a graphic representation of the receipt of a message and the transmission of a responsive message.

This is illustrated in FIG. 7 for the receipt of an "SDA" message and the subsequent transmission of an "ACK or a "NAK" responsive message. Referring to FIGS. 3 and 7, the SDA message includes two preamble bytes (P), followed by a FLAG byte and a destination code (DEST). When the first byte of the message is de-serialized by the serial-to-parallel converter 304, the serial-to-parallel converter 304 signals, the receive control 302 and the processor interface control 267. The receive control 302 responds by passing the destination code and all subsequent codes and data in the message to the receive FIFO memory 280.

In response to the received destination code, the processor interface control 267 generates a start of message interrupt request through one of the control lines 229 at the time $t_1$. As will be explained below, the interface controller 222 (FIG. 2) responds to the interrupt by performing a number of functions during the time period $t_1$, through $t_2$ as indicated by block 410. These functions include enabling the DMA control 257 to transfer the incoming data from the receive FIFO memory 280 to a message buffer in the shared RAM 211 (FIG. 2) and to form an ACK message in the transmit FIFO memory 281. These functions are performed while the incoming SDA message is still being received, and the interface controller 222 usually completes the servicing of the start of message interrupt before the end of the message is received.

Referring still to FIGS. 3 and 7, at the end of the data field in the SDA message are two CRC bytes that are applied to the CRC checker 305. At time $t_3$ the CRC checker 305 compares these bytes and the CRC bytes it has calculated as the message data was received with a known constant to determine if either has been corrupted. At time $t_4$ after a flag byte has been received, the CRC checker either sets or resets the "CRC bad" bit in the receive syndrome register 268 and it signals the processor interface control 267 to again interrupt the interface controller 222. At the time $t_4$ the transmit control 306 is signaled that the end of a message has been correctly received and it presets the holdoff timer 266. When the holdoff timer subsequently "times out" the responsive message is transmitted.

As will be explained in more detail below, following the end-of-message interrupt at time $t_4$, the interface controller 222 performs a number of functions as indicated at block 411. Most importantly, it checks the CRC bad bit in the receive syndrome register 268 to determine if the message was correctly received. If so, the interface controller 222 completes the processing of the received message, but if the CRC is bad, it cleans out the corrupted message and performs other error recovery procedures. Depending on the demands made on the interface controller 222, this end-of-message interrupt service routine 411 may be completed before the holdoff timer "times out" at $t_6$, or it may continue past that time. The responsive message which was previously prepared for transmission is transmitted beginning at the time $t_6$ irrespective of the state of the interface controller 222. As a result, the time interval between messages is not delayed by the interface controller 222 which performed its time-critical function earlier during the interval $t_1$ to $t_2$, and this inter-frame interval remains fixed during normal operation of the system.

As indicated above, the interface controller 222 is interrupted twice each time a message is received at either the A or B channel. The programs which are executed in response to these interrupts are illustrated in FIGS. 8A and 8B and will now be described in detail.

Figure 8A:
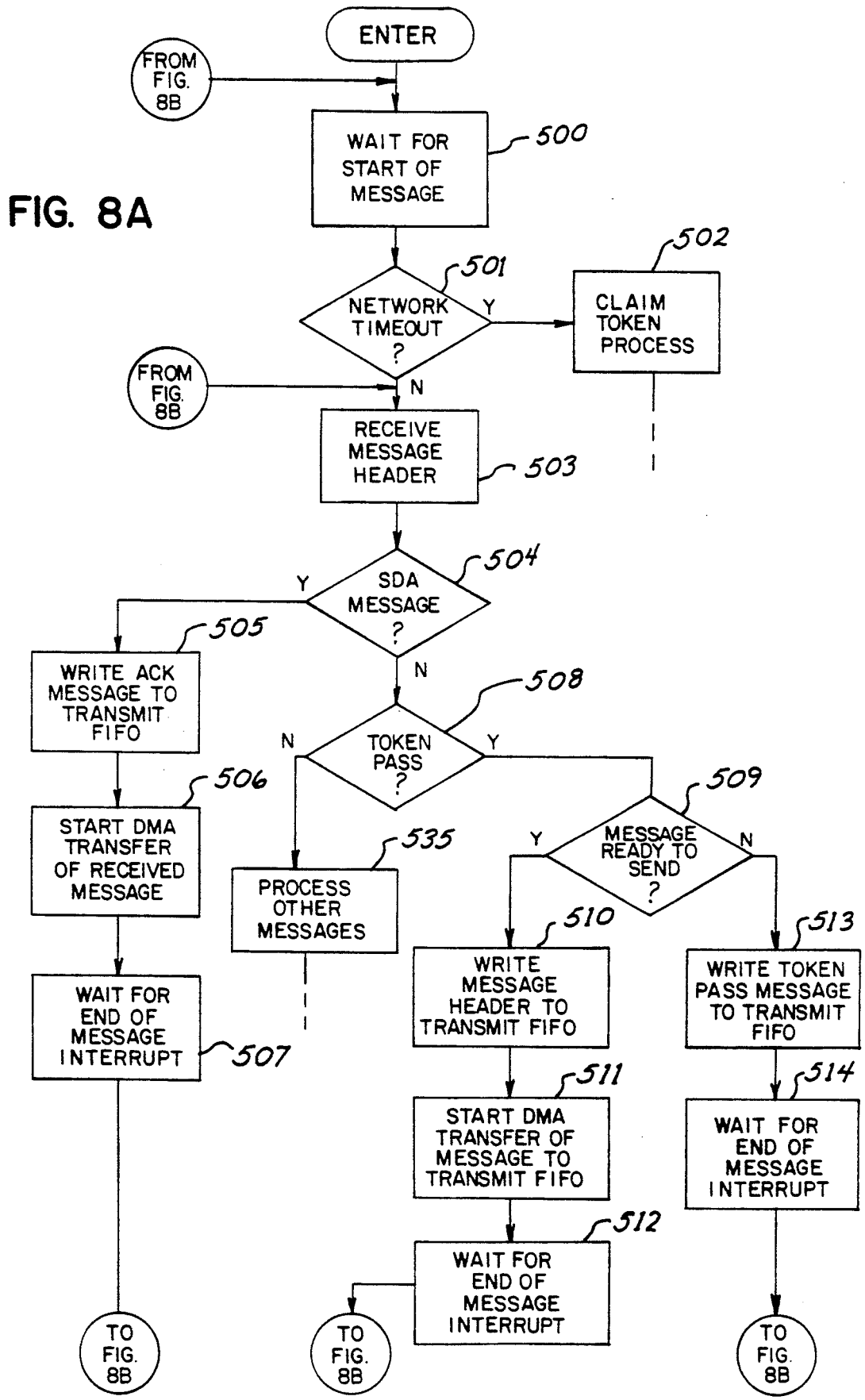
FIGS. 8A and 8B are flow charts of the interrupt service routines which are executed by the interface controller of FIG. 2.
Figure 8B:
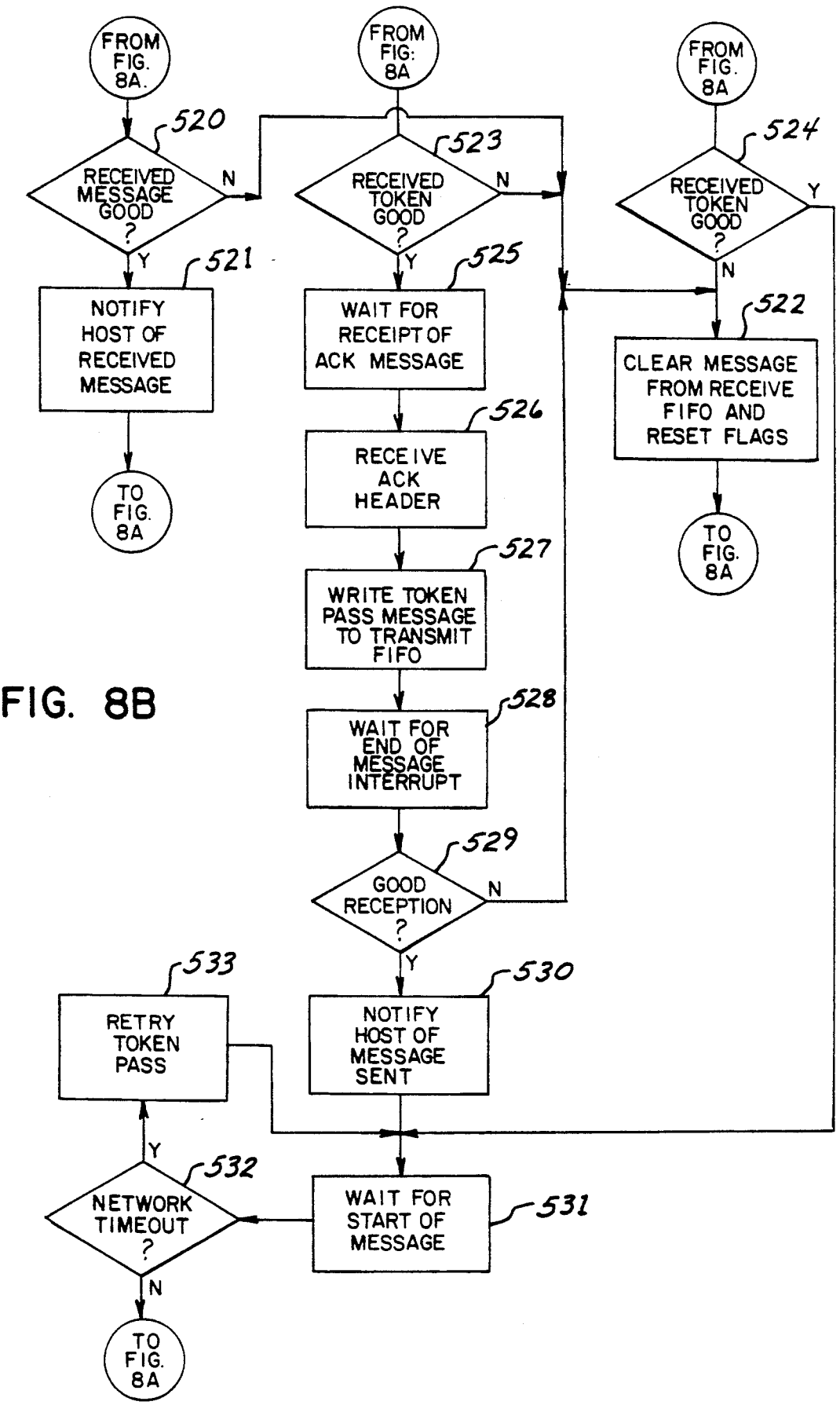

Referring particularly to FIG. 8A, the interface controller waits at process block 500 for a message to be received by either channel A or channel B. The interface circuitry 210 interrupts the controller 222 either when a message is received or the "network dead" timer times out and the controller 222 examines timers 266 at decision block 501 to determine if this is the cause of the interrupt. If so, a claim token procedure is started as indicated at process block 502, otherwise, an incoming message has been detected.

The message header comprised of the DEST, CNTRL and SRCE bytes is received at 503 and the CNTRL byte is examined at decision block 504 to determine if it is an SDA message. If so, the controller 222 begins to set up the responsive ACK message even before the entire incoming SDA message is received. This is accomplished at process block 505 by writing an ACK message to the transmit FIFO using the DEST and the SRCE bytes from the incoming SDA message. The DMA control 257 is then set up at 506 to begin transferring the incoming SDA message from the receive FIFO memory 280 to the shared RAM 211 and the controller 222 then remains in a wait state at 507.

A similar process occurs if the received message is a token pass as determined at decision block 508. First, a check is made to determine if a message is ready for transmission at decision block 509, and if so, the proper message header is written to the transmit FIFO memory 281 at block 510 and the DMA control 257 is set up to transfer the message data to the transmit FIFO memory 281 at block 511. These steps occur while the remainder of the token pass message is still being received and the controller 222 then waits at process block 512 for the end of message interrupt from the interface circuit 210. If there are no messages to be sent, the controller 222 writes a token pass message into the transmit FIFO memory 281 at process block 513 and waits for the end of message interrupt at block 514.

Referring particularly to FIG. 8B, when the end of message interrupt occurs after receipt of an SDA message, the controller 222 checks the processor status register 268 at decision block 520 to determine if the CRC check was good. If so, the interface circuit 210 has already begun sending the ACK message previously written into the transmit FIFO memory 281, and all the controller 222 need do is notify the host at process block 521 that a valid message is available in the shared RAM 211. If the CRC is bad, the interface circuit 210 the ACK message in the transmit FIFO memory 281 to a NAK message and the controller 222 branches at decision block 520 to clear the received message and reset the CRC flag in the processor status register 268 at process block 22. In any case, the system then loops back to process block 500 (FIG. 8A) to await the receipt of another message.

Referring still to FIG. 8B, when the end of message interrupt occurs after the receipt of a token pass, the CRC flag is checked at decision block 523 or 524 depending on whether a message was to be sent. If so, the interface circuitry 210 has already initiated transmission of the message and the controller 222 waits at process block 525 for the receipt of the responsive ACK message. When received, the header of the ACK message is received first at 526 and the controller 222 begins to form a suitable token pass message which is written to transmit FIFO memory 281 at process block 527. The controller 222 then waits for the end of the ACK message interrupt at process block 528 and its CRC byte is checked at decision block 529. If good, the interface circuitry has already initiated transmission of the token pass message and the controller 222 notifies the host that the message was sent and acknowledged at process block 530. The controller 222 then monitors the network at process block 531 to await the receipt of another message. If none is received within a preset timeout period as determined at decision block 532, the token pass message is retransmitted at process block 533. When the token has been successfully passed, the system loops back to process block 503 (FIG. 8A) to process the received message.

When a token message has been successfully received but no messages are awaiting transmission, the controller 222 branches at decision block 524 (FIG. 8B). In this instance, the interface circuitry has already sent a responsive token passage message and the controller 222 waits at process block 531 for the new token holder to send a message as described above.

It should be apparent to those skilled in the art that the system described in FIGS. 8A and 8B has been simplified to clarify how the present invention is implemented. For example, many other message types can be received and processed as indicated generally by process block 535 in FIG. 8A. Also, the process of retrying the token pass is shown simply as a block 533 in FIG. 8B, but it can be appreciated that after a designated number of retries, an error recovery procedure is initiated.

We claim:

1. An interface circuit for connection to he communications media of a communications network, the combination comprising:
    a protocol machine having a receive section which connects to the communications media to receive messages and having a transmit section which connects to the communications media to send messages which are written to the transmit section; and
    an interface controller connected to the protocol machine and including:
        (a) means coupled to said receive section for analyzing a control code in a first message as it is received by the receive section of the protocol machine;
        (b) means coupled to said last named means (a) for writing a responsive second message to the transmit section of the protocol machine while the protocol machine continues to receive the first message;
        (c) means coupled to said receive section for checking the integrity o the first message when it has been completely received to determine if any errors occurred;
        (d) means coupled to said last named means (c) for processing the received first message f no errors are detected; and
        (e) means coupled to said checking means (c) or conducting an error recovery sequence if an error is detected;
    wherein the transmit section of the protocol machine operates to transmit the second message a preset time interval after the correct receipt of the fit message.

2. The interface circuit as recited in claim 1 in which the interface controller is a programmed microcomputer.

3. The interface circuit as recited in claim 2 in which said means for conducting an error recovery sequence includes means for forming a third message and means for writing said third message to the transmit section of the protocol machine in place of said second message.

4. The interface circuit as recited in claim 1 which further includes a shared memory coupled to the protocol machine for storing messages received by the protocol machine, and the interface controller includes:
    (f) means coupled to said processing means (d) for signaling a host processor that a received message may be read from the shared memory when no errors are detected in said received message.

* * * * *

UNITED STATES PATENT AND TRADEMARK OFFICE
CERTIFICATE OF CORRECTION

PATENT NO. : 5,153,884  
DATED : October 6, 1992  
INVENTOR(S) : Mark A. Lucak, et al.

Page 1 of 2

It is certified that error appears in the above-identified patent and that said Letters Patent is hereby corrected as shown below:

In the ABSTRACT:

Line 3, "network. In", should be --network. It--.

Col. 4, line 34, "213.. The", should be --213. The--.

Col. 5, line 1, "buses and 224", should be --buses 223 and 224--.

Col. 5, line 26, "2 and , 3,", should be --2 and 3,--.

Col. 12, line 4, "time $t_4$ ,", should be --time $t_4$,--.

UNITED STATES PATENT AND TRADEMARK OFFICE
CERTIFICATE OF CORRECTION

PATENT NO. : 5,153,884

DATED : October 6, 1992

INVENTOR(S) : Mark A. Lucak, et al.

It is certified that error appears in the above-identified patent and that said Letters Patent is hereby corrected as shown below:

Col. 13, line 13, "block 22", should be --block 522--.

<u>In the CLAIMS</u>:

Col. 14, line 25, "integrity o the", should be

--integrity of the--.

Col. 14, line 29, "message f no", should be --message if no--.

Col. 14, line 31, "(c) or", should be --(c) for--.

Signed and Sealed this

Twenty-second Day of March, 1994

*Attest:*

BRUCE LEHMAN

*Attesting Officer*   *Commissioner of Patents and Trademarks*